United States Patent Office 2,970,034
Patented Jan. 31, 1961

2,970,034

METHOD OF PURIFYING GASES CONTAINING OXYGEN AND OXIDES OF NITROGEN

Holger C. Andersen, Morristown, and William J. Green, Newark, N.J., assignors, by mesne assignments, to Engelhard Industries, Inc., Newark, N.J., a corporation of Delaware No Drawing. Filed Apr. 5, 1957, Ser. No. 650,860

7 Claims. (Cl. 23—2)

This invention relates to the recovery of heating values from and the purification of the waste gases produced by the oxidation of ammonia in the production of nitric acid. The purification step entails the elimination of oxides of nitrogen from the waste gases.

In the production of nitric acid by the oxidation of ammonia, it is difficult to convert all of the oxides of nitrogen to nitric acid, and as a result of the incomplete conversion of these oxides, they are discharged with the waste or tail gases. The presence of such oxides in the waste gases is undesirable as they are of a corrosive nature and constitute a pollution problem.

The waste or tail gases of nitric acid processes generally have a composition, on a dry basis, of 0.1 to 0.5 per cent by volume of mixed nitric oxide and nitrogen dioxide, about 3–4 percent by volume of oxygen, and the remainder being nitrogen. In addition, various amounts of steam may be included with the waste gas.

In copending application Serial No. 615,496, filed October 12, 1956, there is disclosed a single stage catalytic process for the purification of waste or tail gases, wherein oxides of nitrogen are eliminated while heating values of the waste gases are simultaneously recovered, in which the waste gases and a fuel, preferably a hydrocarbon fuel such as natural gas, are passed over a rhodium or palladium-containing catalyst at reaction temperature. In this process the oxygen present in the waste gases is removed by a catalytic combustion reaction, and the oxides of nitrogen are reduced to nitrogen and water. In catalytic processes of the type disclosed in the copending application, supra, it has been found that it is generally necessary to cause reaction of the fuel with the oxygen present in the waste gases in order to decrease the concentration of oxides of nitrogen in the effluent gases to the desired low value. The oxides of nitrogen are removed to a substantial degree only under reducing conditions, i.e. when the fuel is present in stoichiometric excess over the oxygen content of the waste gases. Under such conditions, a very large quantity of heat is generated in the catalyst bed and the temperature rise in the catalyst bed can be calculated from the various heats of reaction and the various specific heats of the gases in the stream. The greater the oxygen concentration in the waste or tail gases, the greater will be the temperature attained by the catalyst, and it has been found that exposure of catalysts to excessive temperatures is detrimental in that a loss of catalyst activity results. Hence, one of the limitations of the catalytic process for the removal of oxides of nitrogen is loss of catalyst activity when the catalyst is subjected to high temperatures, and the problem becomes of greater magnitude with increasing oxygen concentrations in the waste or tail gases.

One method of minimizing the temperature obtained in the catalyst bed is to maintain the temperature of the inlet gas low. The temperature rise caused by the heat of reaction when added to the inlet temperature then represents the minimum catalyst temperature in the bed. This method is limited, however, by the fact that the reaction cannot be initiated below some temperature characteristic of the catalyst, fuel and operating conditions, and this temperature may be designated as the ignition temperature.

In accordance with the present invention, the removal of oxygen and the catalytic reduction of oxides of nitrogen in waste or tail gases is effected in two stages in such a manner that only a part of the total heat is generated in each stage. The temperature to which the catalyst is subjected is thus described and its life and activity are correspondingly extended. Specifically, the process comprises three steps:

(1) Fuel is added to the waste or tail gas stream in a quantity less than the stoichiometric quantity required for complete reaction with the oxygen and oxides of nitrogen present therein, and this mixture of gases is then passed through a first stage catalyst bed. If, for example, only one-half of the stoichiometric quantity of fuel is added, the temperature rise in the first stage catalyst bed will be about one-half of that calculated for the full fuel complement.

(2) The effluent gases from the first stage are then cooled to a temperature suitable for initiating reaction in the second stage and the heat removed may be recovered, if desired.

(3) Additional fuel is added to the cooled effluent gases from the first reaction stage, and the resulting gaseous mixture is passed through a second stage catalyst bed. In general, the quantity of fuel added at this point is in stoichiometric excess over that required by the oxygen and nitrogen oxides present in the stream at this point.

The catalyst used in the process of this invention may be a platinum group metal containing catalyst per se on a suitable support, or a platinum group metal in admixture with another of the platinum group metals, i.e. platinum, palladium, rhodium, ruthenium, iridium and osmium. Suitable catalyst supports are alumina, including activated alumina and the like, silica, silica gel, diatomaceous earth and other similar metal catalyst supports. For optimum conversion, the catalyst metal should be within the range of 0.1 to 5 percent by weight of the catalyst metal and support, preferably about 0.1 to 1 percent by weight of the catalyst metal and support. The support for the catalyst metal may be in the form of pellets, granules or powder, and preferably comprises alumina. The supported catalyst may be prepared in any suitable manner, i.e. by treating the carrier or support with a solution of a suitable metal compound and then reducing the metal compound to metal.

The fuel used may be hydrogen, carbon monoxide and the like, and is preferably a hydrocarbon fuel such as natural gas or methane, but it may have a varied composition. In general, the more excess fuel used, the more complete will be the removal of oxides of nitrogen.

In the first reaction stage, the space velocity may be in the range of 20,000 to 200,000 volumes of gas per volume of catalyst per hour, preferably 30,000 to 130,000 volumes per volume per hour, measured at standard conditions of temperature and pressure. Inlet temperatures in the range of about 200 to 900° F. may be used, depending upon the fuel, catalyst and reaction conditions employed. For hydrocarbon fuel, the preferred range is about 400 to 850° F. The fuel is added to the first stage gas stream in a quantity equivalent to about 30 to 70 percent of the stoichiometric quantity required for complete reaction with the oxygen and oxides of nitrogen present in the gas stream.

In the second reaction stage, the conditions employed are similar to those used in the first reaction stage, with the exception that an excess of fuel is added over the stoichiometric quantity required for complete reaction with the sum of the oxygen and nitrogen oxides entering the second reaction stage. The fuel excess is necessary in order to obtain complete, or substantially complete, reduction of the oxides of nitrogen in the second stage, since essentially no reduction of these oxides occurs in the first reaction stage. Generally, the fuel is added in an excess of 1 to 50 percent by volume over the stoichiometric quantity required for complete reaction with the oxygen and oxides of nitrogen entering the second stage, with an excess of 3 to 20 percent by volume being preferred.

The inlet temperature in the second stage may be slightly higher than that employed in the first stage, other conditions being equal, due to the increase in water content produced by fuel combustion in the first stage; water vapor is known to increase the temperature required for ignition. The completeness of removal of oxides of nitrogen is adversely affected by excessively high space velocities, and space velocities of 30,000 to 100,000 volumes per volume per hour are preferred for hydrocarbon fuels.

The pressure in the first and second stage may be in the range of atmospheric to 500 p.s.i.g. or higher, preferably atmospheric to 200 p.s.i.g.

The invention will be further illustrated by reference to the following specific examples:

EXAMPLE I

It is time consuming and expensive to determine experimentally the effect of temperature on catalyst life, since very long periods of testing would be required. In lieu of this, experiments were performed in which catalyst samples were exposed to high temperatures for relatively short periods, and the activity of the catalyst was then compared with that of the original catalyst by comparing the ignition temperatures of a specific fuel-air mixture.

After a catalyst consisting of 0.5 percent palladium on 1/8" activated alumina pellets was heated in air to 1110° F. for 16 hours, it caused ignition of a gas-fuel mixture at a temperature of 590° F., which is equal to the ignition temperature of a catalyst sample not previously heated. The gas-fuel mixture used for this purpose consisted, by volume, of 0.3 percent nitric oxide, 3 percent oxygen, 1.6 percent methane, and the balance was nitrogen. However, when another sample of the same catalyst was heated at 1290° F. for 16 hours the subsequent ignition temperature increased to 700° F., and after heating for 16 hours to a temperature of 1470° F., the ignition temperature was 765° F. The catalyst samples evaluated by this method showed a decrease in activity after heating to temperatures of 1200° F., and from this it was concluded that in catalytic processes of this type, temperatures in excess of 1200 to 1300° F. should be avoided.

EXAMPLE II

A two-stage catalytic process run was made in which methane was added to a simulated nitric acid plant waste or tail gas. In the first reaction stage, the methane addition ranged from 43 to 57 percent by volume of the stoichiometric quantity required for reaction with the oxygen present, the oxygen being present in the amount of 3 percent by volume. With gas entering the first stage at a temperature of 760 to 770° F., temperatures in the range of 1050 to 1125° F. were produced in the catalyst.

In the second stage, the same catalyst bed was employed, but methane was added to simulate nitric acid plant waste or tail gas containing only 1.5 percent oxygen by volume instead of 3 percent oxygen by volume as was employed in the first stage run. The methane additions varied from approximately the stoichiometric requirement for complete reaction with oxygen to 130 percent of the oxygen requirement. If the oxides of nitrogen are taken as having one-half the oxidizing value of oxygen, then the actual fuel excess in the gas where 130 percent of the oxygen requirement is added, is only 20 percent rather than 30 percent. The oxides of nitrogen found downstream in the catalyst bed decrease as the fuel to oxygen ratio is increased.

In these runs, the fuel used was methane and the pressure was 100 p.s.i.g., the space velocity in each stage was 60,000 standard volumes per volume per hour, and the catalyst was 0.5 percent palladium on 1/8" cylindrical activated alumina pellets.

The results are as follows:

Table I

| | Temperatures, °F. | | °F., ΔT | Percent $O_2$, in | Percent Fuel | Percent $O_2$/Percent Fuel | Percent NO, out |
|---|---|---|---|---|---|---|---|
| | Inlet | Catalyst | | | | | |
| 1st stage | 762 | 1,075 | 313 | 2.95 | 0.75 | 4.00 | 0.30 |
| | 770 | 1,050 | 280 | 2.95 | 0.65 | 4.5 | |
| | 765 | 1,125 | 360 | 2.95 | 0.86 | 3.4 | |
| 2nd stage | 760 | 1,125 | 365 | 1.54 | 0.86 | 1.80 | 0.0060 |
| | 760 | 1,125 | 365 | 1.49 | 0.89 | 1.67 | 0.0009 |
| | 760 | 1,110 | 350 | 1.48 | 0.98 | 1.50 | .0 |
| | 760 | 1,062 | 302 | 1.50 | 0.76 | 1.97 | 0.25 |

It will be obvious to those skilled in the art that many modifications may be made within the scope of the present invention without departing from the spirit thereof, and the invention includes all such modifications.

What is claimed is:

1. A process for the purification of waste gases from nitric acid processes containing oxygen and oxides of nitrogen which comprises contacting in a first reaction zone at reaction temperature the waste gases and a fuel selected from the group consisting of hydrogen, carbon monoxide and gaseous hydrocarbons, the latter being present in less than the stoichiometric quantity required for complete reaction of the oxygen in the waste gases, with a platinum group metal-containing catalyst, cooling the effluent gases, and contacting in a second reaction zone a mixture of the effluent gases and additional fuel, the latter being present in stoichiometric excess over the oxygen and oxides of nitrogen in the effluent gases, with a platinum group metal-containing catalyst at reaction temperature.

2. A process according to claim 1 in which the catalyst is rhodium.

3. A process according to claim 1 in which the catalyst is palladium.

4. A process according to claim 1 in which the fuel is natural gas.

5. A process according to claim 1 in which the fuel is methane.

6. A process according to claim 1 in which the space velocity in each zone is in the range of about 20,000 to 200,000 standard volumes of gas per volume of catalyst per hour.

7. A process according to claim 1 in which the inlet temperature in each zone is in the range of about 200 to 900° F.

(References on following page)

References Cited in the file of this patent

UNITED STATES PATENTS

| | | |
|---|---|---|
| 1,487,647 | Fauser | Mar. 18, 1924 |
| 2,381,696 | Shapleigh | Aug. 7, 1945 |
| 2,387,577 | Green | Oct. 23, 1945 |
| 2,475,155 | Rosenblatt | July 5, 1949 |
| 2,582,885 | Rosenblatt | Jan. 15, 1952 |
| 2,606,875 | Rosenblatt et al. | Aug. 12, 1952 |

OTHER REFERENCES

Dixon and Vance: "The Reaction Between Nitrous Oxide and Hydrogen on Platinum," The Journal of the American Chemical Society, vol. 57, January-June 1935, pages 818–821.

Duparc et al.: "Recherches sur la catalyse gazeuse au moyen des métaux du groupe du platine," Helvetica Chimica Acta, volume 8, 1925, pages 609–631, Geneva.